United States Patent [19]

Taguchi et al.

[11] Patent Number: 5,053,988
[45] Date of Patent: Oct. 1, 1991

[54] DATA PROCESSING APPARATUS

[75] Inventors: Yasuhiro Taguchi; Kazuhiko Takata, both of Nara, Japan

[73] Assignee: Sharp Kabushiki Kaisha, Osaka, Japan

[21] Appl. No.: 563,817

[22] Filed: Aug. 6, 1990

Related U.S. Application Data

[63] Continuation of Ser. No. 233,256, Jul. 22, 1988, abandoned.

[30] Foreign Application Priority Data

Jul. 24, 1987 [JP] Japan .............................. 62-186415

[51] Int. Cl.⁵ .......................................... G06F 15/40
[52] U.S. Cl. ................. 364/900; 364/943.43; 364/957.3
[58] Field of Search ... 364/200 MS File, 900 MS File

[56] References Cited

U.S. PATENT DOCUMENTS

| | | | |
|---|---|---|---|
| 3,610,902 | 10/1971 | Rahenkamp et al. | 364/200 |
| 4,290,114 | 9/1981 | Sinay | 364/900 |
| 4,476,541 | 10/1984 | Boone et al. | 364/900 |
| 4,521,849 | 6/1985 | Wilder | 364/200 |
| 4,547,860 | 10/1985 | Lapeyre | 364/900 |
| 4,589,063 | 5/1986 | Shah et al. | 364/200 |
| 4,730,248 | 3/1988 | Watanabe et al. | 364/200 |
| 4,742,481 | 5/1988 | Yoshimura | 364/900 |

Primary Examiner—David Y. Eng

[57] ABSTRACT

A data processing apparatus includes a plurality of function keys and character input keys, a display for displaying inputted data; and card data group storage device for storing a plurality of card data including numerical data. The card data has a capacity capable of displaying one picture of the display device at one time and can be grouped with other card data through a link data. A card data group specified by the activated keys is read from the card data group storage devices. The numerical data contained in the card data of the selected card data group is processed by various calculations inputted by the function keys. This apparatus further includes a judging/readout circuit for reading out other card data groups associated with the previously readout card data group from the card data group storage device when a judgement concerning the link data attached to each of the card data groups is made. These same calculations can be carried out on the numerical data of other card data in other card data groups judged to have a connection with the initially read card data group after calculating the numerical data contained in the card data of the first card data group.

8 Claims, 4 Drawing Sheets

FIG. 3

```
Name : Taro Yamada              No. 25

Japanese    : 70    Total score : 398

Mathematics : 65    Mean score  : 79.8

English     : 88
```

FIG. 5

```
List of Records in Class A of First Grade

Mean score in Japanese        : 76

Mean score in Mathematics     : 66

Mean score in English         : 82

Mean score in three subjects  : 74.6
```

DATA PROCESSING APPARATUS

This application is a continuation-in-part, of application Ser. No. 07/233,256 filed on July 22, 1988, now abandoned.

BACKGROUND OF THE INVENTION

The present invention relates to a data processing apparatus for processing and managing data in simple organized data bases.

A statistic processing system is disclosed in Japanese Patent Laid-Open Application No. 297958/1987 (U.S. patent application Ser. No. 063,216). This system includes a memory for storing multiple data in table format in which a plurality of matrices are formed. A variety of statistic calculations are executed by using the table format memory, thereby facilitating data input and confirmation, modification and addition to the inputted data.

In this type of system, however, each set of data collected in one table format is processed in accordance with the specified statistic calculations after specifying arbitrary columns or rows and the type of statistic calculation. However, the same statistic calculation can not be executed with respect to a set of data in another equivalent table format, which data are associated with the above-mentioned data to be executed, unless the instruction for the statistic calculation is given once again. Namely, if there are the plurality of sets of data in the table format having equivalent content and the same desired statistic calculation is to be carried out, it is required that the instruction for the statistic calculation on all such occasions be given for each set of data.

As is known, another type of data processing apparatus incorporating a CRT or a dot-matrix LCD as a display unit is arranged such that the data for individuals having, for instance, a list of records which include numerical data are managed on simple organized data bases. In this type of data processing apparatus, the data defined as an object to be managed is recorded on one picture, serving as a sheet of card, of the display unit, thus forming a card data. More specifically, the card data includes a minimum unit data during the process of inputting the data. One or more cards of data are collected to form one card data group (registered text) which will then be stored in a storage device (document file) of the data processing apparatus.

In this data processing apparatus, when the numerical data contained in the card data is calculated, the same calculation is automatically executed on the card data of the same card data group. In connection with the card data of a different card data group, however, the same calculation is not carried out. Where the card data group differs, it is necessary to perform the calculating process each time by reading out the card data group to be arithmetically processed. This leads to complicated operations and also requires much time for processing.

Accordingly, it is a primary object of the present invention to provide a data processing apparatus capable of automatically doing calculation on the card data of other card data groups associated with the card data group being read out when one of the card data of one card data group is calculated.

SUMMARY OF THE INVENTION

A data processing apparatus according to the present invention comprises: key input means having a plurality of function keys and character input keys; display means for displaying inputted data; card data group storage means for storing a plurality of card data including numerical data, said card data having capacity capable of displaying at one picture of the display means at one time and being grouped with a link data of content thereof; readout means for reading out a card data group specified by the key input means from the card data group storage means; calculation means for calculating the numerical data contained in the card data of the card data group read out in conformity with a variety of instructions given from the key input means; judging/readout means for reading out other card data groups associated with the readout card data group from the card data group storage means by making a judgement on the basis of the link data attached to each of the card data groups; and calculation instruction means for causing the calculation means to calculate the numerical data of the card data of the other card data groups having a connection therewith as determined by the judging/readout means subsequently after calculating the numerical data contained in the card data of the readout card data group.

The card data in accordance with the present invention is defined as an aggregation of the minimum unit data when inputting and storing a series of data including the numerical data such as record lists of the individuals or of every class. The card data has a capacity capable of displaying at one picture of the display means at one time, in other words, one display picture of the display means comprising a CRT or a dot-matrix liquid crystal display panel serves as a sheet card. The plurality of card data is combined into one card data group depending upon the kind of content, and the card data group is provided with link data and stored in the card data group storage means.

The card data group storage means is preferably comprised of a magnetic storage medium such as a hard disc or floppy disc having a capacity capable of storing the plurality of card data groups and a driving unit thereof.

The foregoing and other objects, features and advantages of the invention will become more apparent on reading the following detailed description with reference to the accompanying drawings.

BRIEF DESCRIPTION OF THE DRAWINGS

FIG. 3 is a diagram showing a card data format in the embodiment of the present invention;

FIG. 5 is a diagram illustrating a card data format which is to be newly registered in the embodiment.

DETAILED DESCRIPTION OF THE PREFERRED EMBODIMENTS

Figure 1:
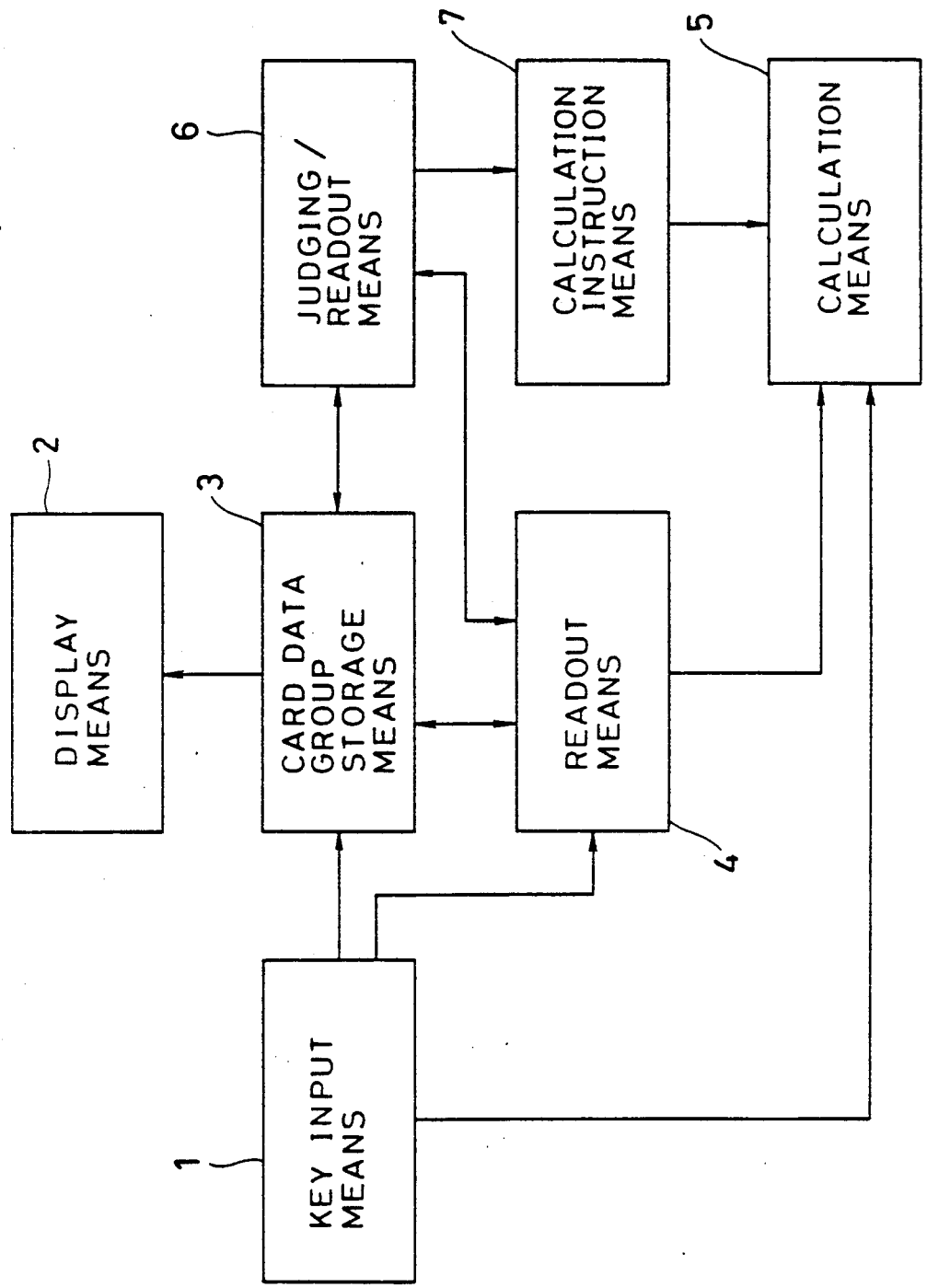
FIG. 1 is a block diagram illustrating a fundamental constitution of the present invention.

In FIG. 1, key input means generally designated at 1 has a plurality of function keys and character input keys. The numeral 2 denotes display means for displaying the inputted data. The numeral 3 represents card data group storage means for storing a plurality of card data including numerical data, the card data having a capacity capable of displaying one picture of the display means 2 at one time and being grouped with a link data of content thereof. The numeral 4 represents readout means for reading out a card data group specified by the key input means 1 from the card data group storage means 3. The numeral 5 represents calculation means for calculating the numerical data included in the card data of the card data group read out in accordance with a variety of calculation instructions received from the key input means 1. The numeral 6 represents judging/readout means for reading out the card data groups associated with the readout card data group from the card data group storage means 3 and for making a judgement on the basis of the link data attached to each card data group. The numeral 7 indicates calculation instruction means for causing the calculation means 5 to calculate the numerical data of the card data of the card data group which is judged to have a connection with the readout card data group upon a determination by the judging/readout means 6 after calculating the numerical data included in the card data of the readout card data group.

Based on the above-described construction, the user indicates an calculation mode by way of the function keys of the key input means 1 and permits the calculation means 5 to perform the calculation process upon the numerical data contained in the card data of the card data group read out by the readout means 4. Then, the judging/readout means 6 recognizes and reads out another card data group relative to the above-mentioned readout card data group on the basis of the link data attached to the foregoing card data group. The calculation instruction means 7 outputs calculation instructions to the calculation means 5 so that the calculation means 5 executes the same calculation process with respect to the numerical data contained in the first card data group upon the next card data group associated with the first card data group. Therefore when doing calculation on the card data of a certain card data group, it is possible to automatically calculate on card data of the associated card data group in accordance with the link data.

Figure 2:
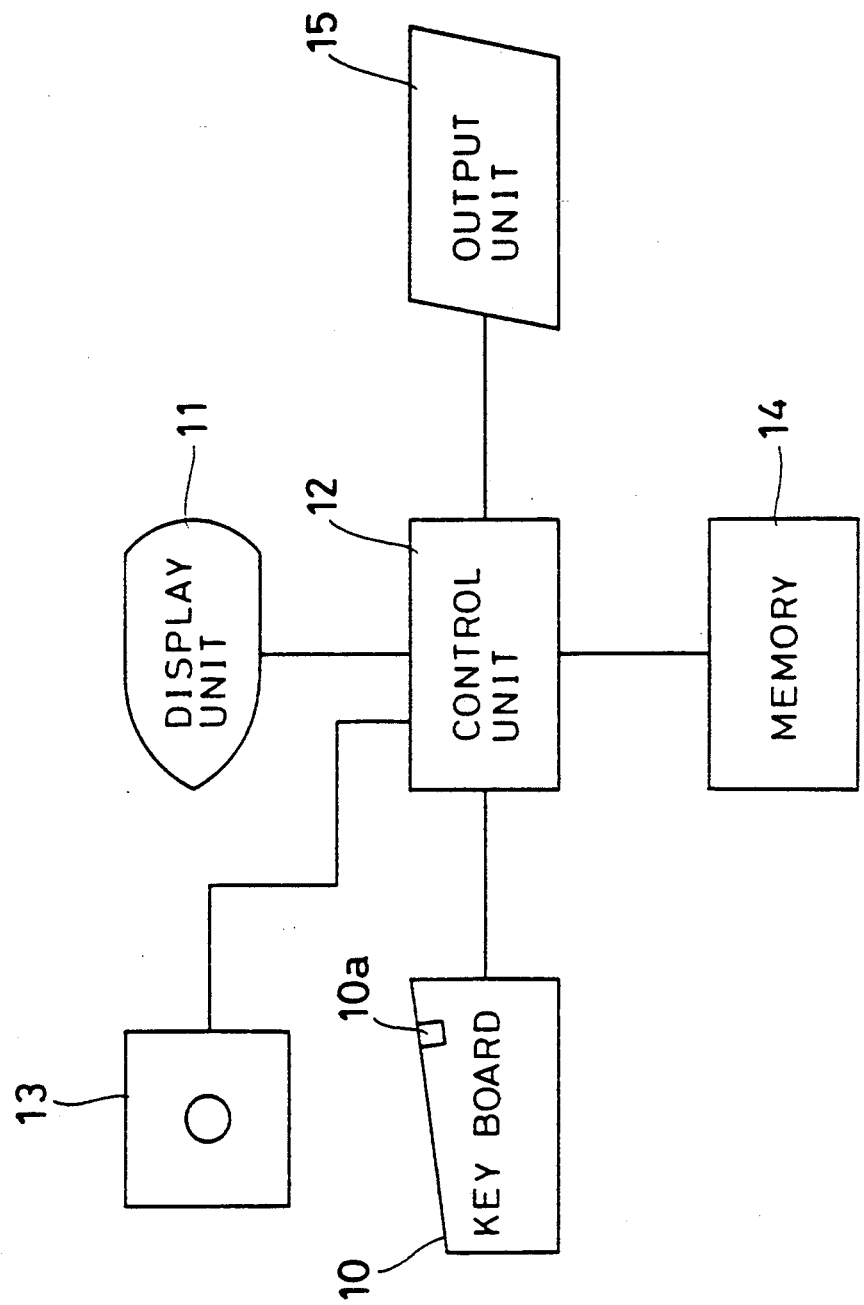
FIG. 2 is a block diagram showing a construction of an embodiment of the present invention.

Turning attention to FIG. 2, there is shown a block diagram of a construction of the embodiment of the present invention. In FIG. 2, the numeral 10 denotes a key board, defined as the key input means, which has: a plurality of function keys for indicating a wide variety of operation modes, including an "calculation" function key 10a for indicating a calculation mode; and character input keys for inputting alpha and numeric data. The numeral 11 denotes a display unit, consisting of, e.g., a CRT, for displaying the inputted data. A control unit generally indicated at 12 controls the system as a whole and calculates the numerical data, this control unit being composed of a microcomputer. An external storage unit 13, formed of a magnetic storage medium such as a floppy disc and a driving unit by which this storage medium is driven, for storing a plurality of card data groups. The numeral 14 designates a memory for temporarily storing the card data group read out from the external storage unit 13. An output unit 15 for outputting results processed by the control unit 12, e.g., a printer. Note that the display unit 11 may be formed of a dot-matrix liquid crystal display panel having, preferably, 640×400 pixels. The control unit 12 includes, for instance, a 8-bit or 16-bit microcomputer and I/O interfaces between the microcomputer, the key board 10, the display unit 11, the external storage unit 13, the memory 14 and the output unit 15. The control unit 12 controls these components on the basis of programs incorporated therein and, as will be mentioned later in greater detail, calculates the numerical data of the card data group in accordance with calculation instructions issued.

Figure 4:
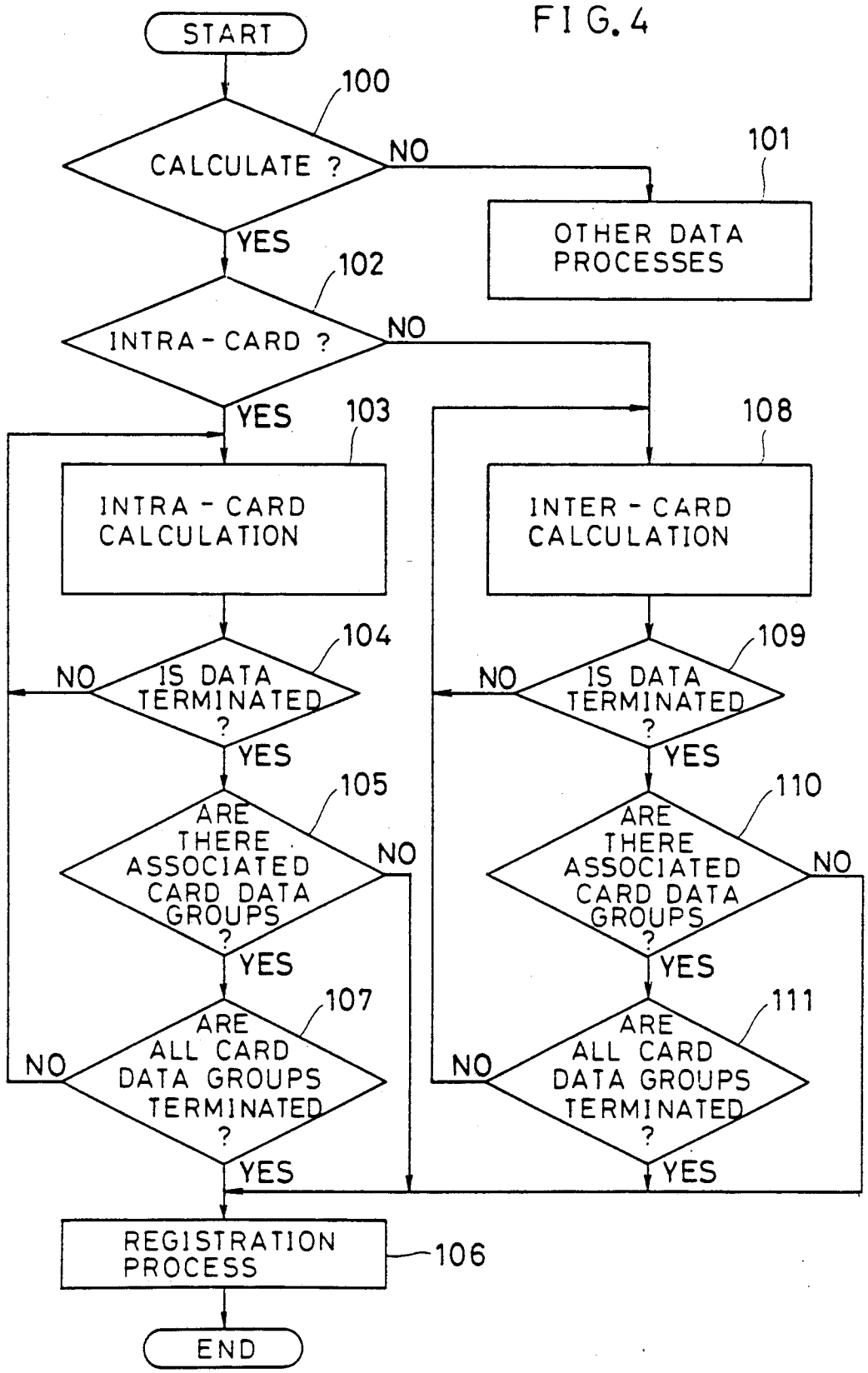
FIG. 4 is a flowchart showing operations of the embodiment.

The next description will be focused on the operation of this embodiment with reference to FIGS. 3 through 5.

The external storage unit 13 stores the plurality of card data groups organized by a plurality of card data 16 each consisting of, as depicted in FIG. 3, a list of individual's records.

The card data 16 is the data having a capacity capable of displaying at one time on a display picture, serving as a sheet of card, of the display unit 11. In the case of the list of records, the data to be stored may include a name, titles of lessons, while the numerical data may include individual's score.

All the titles of the libraries with respect to the card data groups containing the card data 16 are displayed by manipulating the key board 10 and are selectively specified by moving a cursor to the line of a desired card data group. Subsequently, the control unit 12 reads out the specified card data group from the external storage unit 13 and permits the memory 14 to store this data group. Then, the card data on, e.g., the first page of the readout card data group is displayed on the display unit 11.

The calculation operation with respect to the numerical data contained in the displayed card data will be explained in conjunction with a flowchart of FIG. 4.

When the user depresses any one of the function keys a specific data process to be executed is inputted. The control unit 12 judges whether the calculation operation is performed or not (step 100). If not, other data processes, except the calculation process are executed in accordance with the inputted data process instruction (step 101). If judged to be a calculation operation, viz., when the "calculation" function key 10a of the key board 10 is depressed, a judgement as to whether this calculation is a intra-card calculation pertaining to a single sheet of card or an inter-card calculation pertaining to the respective cards within the card data group (step 102) is made. The intracard or inter-card calculation is selectively specified by the user depressing a function key after depressing the "calculation" function key 10a.

The intra-card calculation involves a step of calculating, for instance, a total score of all lessons and a mean score of every lesson with respect to the card data 16. The inter-card calculation implies calculation of a class mean score of every lesson.

If the intra-card calculation is selected at the step 102, the intra-card calculation is carried out on, e.g., the total score of all lessons or the mean score of each lesson (step 103). Then, whether the calculation operations carried out on all the card data of the readout card data group or not is judged (step 104). If it is judged that the data on which the calculation is carried out in the step 104 comes to termination, the apparatus searches the external storage unit 13 to determine other associated card data groups need to be retrieved wherein the determination is based on the link data attached to each card data group at the time of inputting the data of the card data group (step 105). As a result, if there are no associated card data group therein, the result of calculation operation is registered (update registration) in the external storage unit 13 (step 106). If there are associated card data groups in the step 105, such card data groups are sequentially read from the external storage unit 13, thereby performing the calculation on all the card data groups. Upon completion of the calculations upon all the card data groups (step 107), the results are respectively registered in the external storage unit 13.

When it is judged that the inter-card calculation be performed in the step 102, the inter-card calculation, i.e., the calculation of the mean score for each lesson for every class is executed (step 108). Steps 104 through 107 of intra-card calculation, are likewise carried out in the inter-card calculation on the associated card data groups (in the form of steps 109 through 111). The results are registered (new registration), as new card data shown in FIG. 5, in the external storage unit 13.

In the data processing apparatus according to the present invention, where one card data group is read out, and when the numerical data contained in the card data thereof are calculated, the calculation operation is also automatically performed on the numerical data contained in the card data of other associated card data groups that have been judged as being related on the basis of the link data attached to the readout card data group. Hence, the time required for the data calculation operation on the simplified data base can be reduced. Besides, the operativity can also be improved.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or the spirit of the invention.

What is claimed is:

1. A data processing apparatus comprising:
    key input means having a plurality of function keys and character input keys;
    display means for displaying inputted data;
    card data group storage means for storing a plurality of groups of card data, said group of card data including a plurality of card data, each card data including numerical data and having a storage capacity capable of storing all information needed to display one picture on said display means, said plurality of card data groups each having a link data wherein certain card data groups are grouped together by a desired relationship through said link data;
    readout means, operatively connected to said card data group storage means, for reading out a first card data group specified by said key input means from said card data group storage means;
    calculation means, operatively connected to said readout means, for calculating said numerical data contained in each card data of said first card data group read out in conformity with a variety of instructions received from said key input means and for obtaining results from the calculations, said results being stored in said card data group storage means as updated data;
    judging means, operatively connected to said card data group storage means, for determining whether other card data groups stored in said card data group storage means are grouped with said first card data group based on said link data;
    said readout means, in response to said judging means, reading out said other card data groups grouped with said first card data group; and
    calculation instruction means, responsive to said judging means, for controlling said calculation means to calculate said numerical data of each card data of said other card data groups read out by said readout means after calculating said numerical data contained in each card data of said first card data group.

2. The data processing apparatus, as claimed in claim 1, wherein said key input means includes function keys for specifying a calculation mode.

3. The data processing apparatus, as claimed in claim 1, wherein said display means comprises a cathode ray tube.

4. The data processing apparatus, as claimed in claim 1, wherein said display means comprises a dot-matrix liquid crystal display panel.

5. The data processing apparatus, as claimed in claim 1, wherein said card data group storage means comprises a magnetic storage medium and a driving unit thereof.

6. The data processing apparatus, as claimed in claim 5, wherein said magnetic storage medium is a hard disc.

7. The data processing apparatus, as claimed in claim 5, wherein said magnetic storage medium is a floppy disc.

8. A method for automatically processing a related group of organized data in a systematic manner using an electronic apparatus, comprising the steps of:
    (a) inputting alpha and numeric data through a keyboard;
    (b) arranging the numeric data in table format, the table format representing a card data;
    (c) forming card data groups, each card data group including a plurality of related card data which are linked together;
    (d) linking certain card data groups together which are associated with each other by attaching link data to each card data group;
    (e) storing each card data group including linking data in a storage device;
    (f) selecting a desired card data group by using the keyboard;
    (g) obtaining the desired card group from the storage device;
    (h) selecting a calculation to be performed upon the desired card data group by using the keyboard;
    (i) performing the selected calculation of said step (h) on all card data in the desired card data group;
    (j) searching the storage device for other card data groups linked to the desired card data group;
    (k) obtaining the other card data groups linked to the desired card data group upon being found in said step (j);
    (l) performing the selected calculation of said step (h) upon all card data in all the obtained other card data groups linked to the desired card data group; and
    (m) storing results from the calculations of said steps (h) and (l) in a new card data.

* * * * *